United States Patent [19]

Janiak et al.

[11] Patent Number: 4,856,021
[45] Date of Patent: Aug. 8, 1989

[54] ELECTRIC DIRECT-CURRENT SCRAP-MELTING FURNACE

[75] Inventors: Robert A. Janiak, Saint-Genest-Malifaux; Jean G. Davené, Marly le Roi, both of France

[73] Assignee: Zenith Electronics Corporation, Glenview, Ill.

[21] Appl. No.: 79,361

[22] Filed: Jul. 30, 1987

[30] Foreign Application Priority Data

Aug. 1, 1986 [FR] France ............................. 86 11216

[51] Int. Cl.$^4$ ........................... H05B 7/00; F27D 1/00
[52] U.S. Cl. ........................................ 373/108; 373/72
[58] Field of Search ................... 373/72, 107, 108, 71

[56] References Cited

U.S. PATENT DOCUMENTS 4,356,340 10/1982 Stenkvist .............................. 373/107

Primary Examiner—Roy N. Envall, Jr.

[57] ABSTRACT

An electric direct-current metal-melting furnace, comprising a vessel (1) having a bottom (11), at least one consumable electrode (2) and at least one fixed electrode (3) which are fed by respective conductors (22; 5). A magnetic screen is interposed between the batch and a part of the conductors connected to the current source (4), so as to master the deflection effects on the arcs attributable to the magnetic fields generated by the conductors. The magnetic screen is arranged along the bottom (11) of the vessel (1), so as to cover at least that part of the bottom which surrounds each connection of a hearth electrode (3) and at least part of the corresponding return conductor (5).

10 Claims, 2 Drawing Sheets

ELECTRIC DIRECT-CURRENT SCRAP-MELTING FURNACE

FIELD OF THE INVENTION

The invention relates to an electric direct-current furnace for the melting of a metallic raw material, such as scrap iron.

BACKGROUND OF THE INVENTION

It has long been known for electric furnaces to be used for melting scrap iron or similar ferrous raw material and reducing the resulting molten-metal bath, if appropriate with the addition of alloying elements, until a metal of specific composition is obtained.

In general terms, an electric furnace comprises a vessel limited by a sidewall and a bottom, covered with a hearth made of refractory material, and closed by a removable cover in the form of a vault, through which passes at least one electrode which is usually consumable and which consists of a graphite bar mounted so as to be vertically slidable, in such a way that it can descend within the furnace batch, normally scrap iron, which is in contact with at least one fixed electrode located in the hearth.

In the case of a single-phase alternating-current furnace and a direct-current furnace, the consumable electrode and the hearth electrode are connected to the two poles of a current source.

In a two-phase or three-phase alternating-current furnace, the consumable electrodes are connected to the poles of the current source, and the batch in contact with the hearth electrode constitutes the neutral of the system.

One or more electric arcs thus form between the batch and each consumable electrode, and these cause the melting of the scrap and the formation of a metal bath in the bottom of the shaft.

Until now, furnaces supplied with alternating current have been used by preference, but it was found that supplying the electrodes with direct current afforded many advantages, such as a reduction in noise and an increase in energy efficiency, because it is possible to use voltages higher than those possible with alternating current.

However, the use of very high intensities of direct current has until now been avoided, because, the currents always circulating in the same direction in the conductors, the electrodes and the bath generate considerable magnetic fields which deflect the arcs. To overcome this disadvantage, it has already been proposed to make the hearth electrode in the form of a plurality of conductive elements connected to the current source by means of one and the same return conductor and incorporated in the bottom, covering a zone of the latter of relatively large area centered relative to the vertical axis of the consumable electrode, so that the electric arc forms in the axis of this conductive zone. Moreover, in order to reduce the effects exerted on the arcs by the magnetic fields generated as a result of the circulation of current in the conductors connecting electrodes to the current source outside the furnace, it has also been proposed to surround the latter with a cylindrical screen made of magnetic metal and covering that part of the sidewall of the furnace which faces the current source, so as to form a magnetic core, rather than a "Faraday cage", interposed between the electrodes and the external conductors connected to the current source.

Such arrangements are often inadequate when a single consumable electrode arranged in the axis of the furnace is used.

But to obtain high electrical powers, it is expedient to pass the current through several vault electrodes, usually three, located above one or more hearth electrodes, thus making it possible to generate several electric arcs in the batch, but increasing the number of feed and return conductors generating magnetic fields and, consequently multiplying the deflection effects exerted on the arcs.

As long as the batch is in the form of scrap, the electrodes penetrate into this, at the same time digging in it pits which to a certain extent isolate the arcs from one another and promote their stability. In contrast, when the batch is completely melted, the arcs subjected to the magnetic effects generated as a result of the passage of the current in the electrodes, the conductors and other parts of the installation can form in unforeseeable directions and are therefore highly unstable.

The zone in which the arcs form and which is at the highest temperature consequently cannot be kept in the center of the furnace, the result of this being that the walls and the bottom can be subjected to excessive temperatures and to considerable wear of the refractory.

SUMMARY OF THE INVENTION

The invention overcomes these disadvantages by producing the magnetic screen in a way which makes it possible to master and, at all events, reduce the deflection effects of the arcs attributable to the passage of the current, even in a high-power furnace equipped with several vault and hearth electrodes. The invention also makes it possible to cause the arcs to converge towards a specific zone of the furnace as a function of the position of the electrodes.

According to the invention, the magnetic screen is arranged along the bottom of the vessel, so as to cover at least that part of the bottom which surrounds each connection of a hearth electrode to the corresponding return conductor.

In an especially advantageous embodiment, all or part of the metal bottom of the vessel is given a thickness greater than the thickness merely necessary to ensure mechanical resistance, which is determined as a function of the current intensity and the orientation of the conductors, so that the said bottom itself forms a magnetic screen of sufficient permeability to reduce the deflection effects on the arcs.

Advantageously, the bottom of the vessel is made, at least partially, of a metal of high relative magnetic permeability.

In a more advantageous embodiment, since the bottom of the vessel is provided with passage orifices for the hearth electrodes, each return conductor is associated with an individual magnetic screen comprising a plate of high magnetic permeability which is arranged underneath the corresponding orifice, and the dimensions and position of which are determined so as to mask a sufficient length of the conductor relative to the orifice, thus preventing the corresponding field lines from passing through this orifice.

BRIEF DESCRIPTION OF THE DRAWINGS

In order that the invention may be more clearly understood, it will now be described with reference to several embodiments given by way of example and illustrated in the accompanying drawings, in which.

DESCRIPTION OF PREFERRED EMBODIMENT

Figure 1:
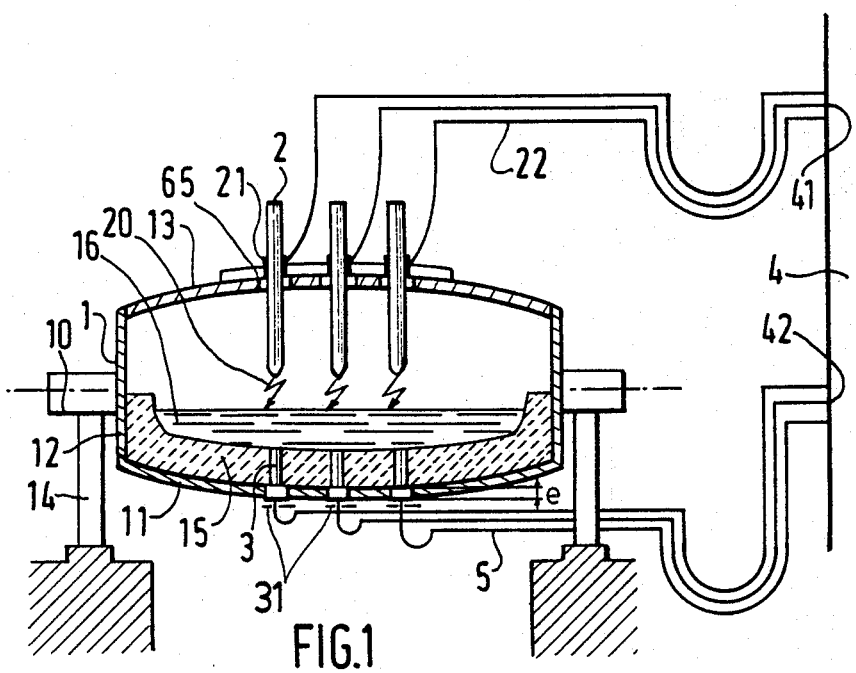
FIG. 1 is a schematic general view of an electric scrap-melting furnace.

FIG. 1 shows diagrammatically an electric scrap-melting furnace comprising a vessel 1 delimited by a bottom 11 and a sidewall 12 and closed by a removable cover in the form of a vault 13. The vessel is supported by means of rolling or pivoting bearings 14, allowing it to be tilted about a horizontal axis in order, for example, to discharge the slag on one side and the molten metal on the other side. The casting holes and the scrap loading orifice have not been shown.

Mounted on the vault 13 are consumable electrodes, for example three electrodes 2 consisting of graphite bars mounted on the vessel so as to slide vertically in passages 65, a device 21 serving as a means of electrical connection. The means for the progressive lowering of the electrodes 2 have also not been shown.

The bottom 11 of the vessel 1 is covered with a hearth 15 made of refractory material, in which are incorporated fixed electrodes 3 passing through the bottom 11. Located near the vessel 1, but at a sufficient distance to be protected from the heat and splashes of metal is a direct-current source 4, for example a transformer rectifier comprising two poles, namely a negative pole 41 connected to the consumable electrodes 2 by means of feed conductors 22 and a positive pole 42 connected to the hearth electrodes 3 by means of return conductors 5.

By means of these well known arrangements, the passage of current through the electrodes causes electric arcs 20 to form between the electrodes 2 and the scrap which, as a result of melting, forms a bath 16 of liquid metal. The passage of current is continued until complete melting, and until the desired composition is obtained as a result of the addition of alloying elements.

In order as far as possible to prevent magnetic fields generated as a result of the passage of current through the conductors from exerting an influence on the electric arcs, it is preferable if the conductors leave in a vertical direction parallel to the electrodes, up to a sufficient distance to ensure that the horizontal parts of the conductors connected to the current source 4 have no appreciable influence on the arcs. This is the solution adopted in FIG. 1 for the vault electrodes 2. A similar solution could be adopted for the return conductors 5, but the disadvantage of such an arrangement is that the conductors go through the zone which is located underneath the vessel and in which it is expedient to leave a passage, for example for supporting carriages of the pouring ladles.

In the installation according to the invention, it is therefore preferable if the return conductors 5 pass relatively near the bottom 11 of the vessel, but there being along the said bottom a magnetic screen which surrounds each connection of a hearth electrode and which extends above each return conductor 5 over the length necessary to reduce the deflection effects on the arcs.

Since the hearth electrodes 3 are distributed normally about the axis of the furnace, it is therefore appropriate to provide a magnetic screen covering at least the entire central part of the bottom 11.

In an especially advantageous way, the magnetic screen can be formed by the bottom 11 itself or, at all events, by the central part of the latter.

Since the function of the metal bottom 11 is to support the hearth 15 made of refractory material, on which the metal bath 16 forms, the type of metal of which it is made and its thickness are normally determined solely in order to ensure the necessary mechanical resistance as a function of the forces which are supported. According to the essential characteristic of the invention, the bottom 11 is given a greater thickness e which is calculated not simply as a function of the forces exerted, but as a function of the foreseeable intensities of the currents passing through the return conductors 5, in order to master the effects which the magnetic fields generated as a result of the passage of current have on the arcs. In fact, it was found that the price increase resulting from this extra thickness could be compensated by savings made, for example, in terms of the wear of the refractory, inasmuch as there was a more effective control of the centering of the arcs.

In order further to increase the effect of reducing the magnetic fields to a minimum, it may even be expedient to produce the bottom 11 at least partially, for example in the part surrounding the connections of the hearth electrodes 3, from a special alloy of high relative magnetic permeability. The part forming the magnetic screen will cover at least one-fifth of the surface of the bottom, but the latter can nevertheless form the said screen completely.

Figure 2:
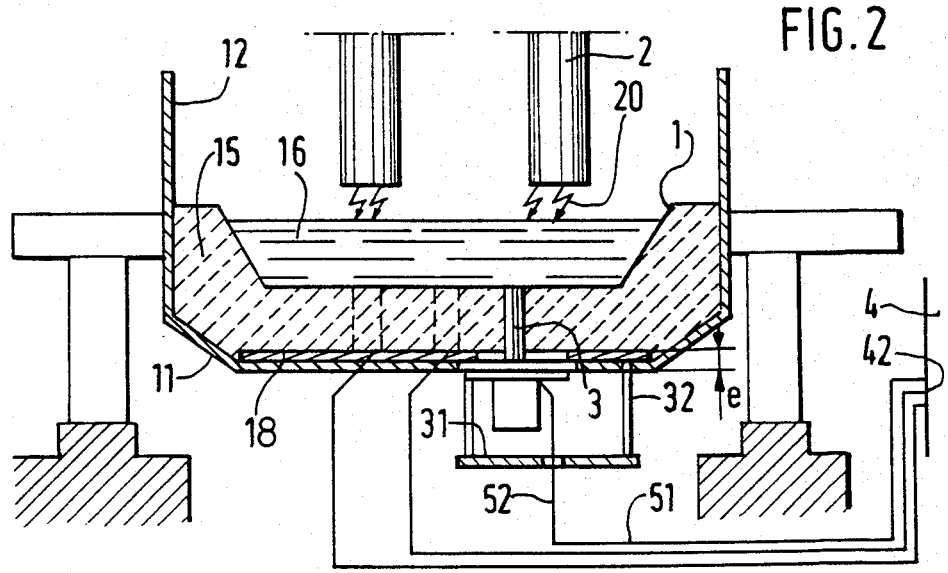
FIG. 2 shows schematically, in elevation, a furnace vessel equipped with an additional masking screen for the return conductors.

In general terms, the thickness of the sheet metal forming the bottom and its magnetic permeability will be determined as a function of one another, to ensure that the field lines are absorbed and remain in the sheet metal without this being saturated, the magnetic field generated by the conductors thus being channeled and prevented from spreading inside the vessel. Therefore, taking into account the current intensity and the positioning of the conductors, especially the return conductors 5, it is possible to modify either the thickness of the bottom 1 or the type of metal of which it is made, in order to produce a magnetic shield preventing the fields from spreading inside the vessel. For this purpose, it is possible either to make the entire bottom of a thicker sheet metal, if appropriate laminated metal, or to lay on or under the existing bottom an additional plate 18 (FIG. 2) capable of forming, together with the bottom, a magnetic screen of the desired thickness and dimensions, and this plate can be made of an alloy of high magnetic permeability. Moreover, the design and positioning of the additional plate can be determined as a function of the orientation of the return conductors in relation to the consumable electrodes 2.

Figure 3:
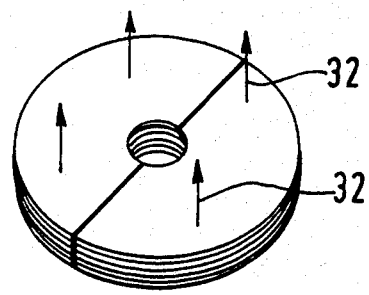
FIG. 3 shows a masking screen in perspective.

However, it is also necessary to allow for the fact that the hearth electrodes 3 must pass through holes made in the refractory 15 and the bottom 11, and since they and their support and the connections of the conductors are made of non-magnetic metal, each electrode 3 forms an orifice allowing the field lines to pass through the bottom. To provide a continuous screen preventing the passage of the field, it is therefore preferable to associate with each hearth electrode 3 a masking screen 31 which comprises a plate suspended on the bottom 11, for example by means of tie rods 32, and which is arranged so as to be interposed between the hearth electrode 3 and the corresponding conductor 51. This screen 31 can consist of a thick metal sheet or, as shown in FIG. 3, of a stack of metal sheets making it possible to obtain the desired permeability.

Figure 4:
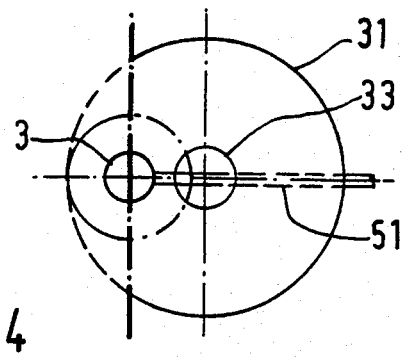
FIG. 4 and FIG. 5 are detail views showing the positioning of the masking screen relative to the hearth electrode in a plan view, and in a side view respectively.
Figure 5:
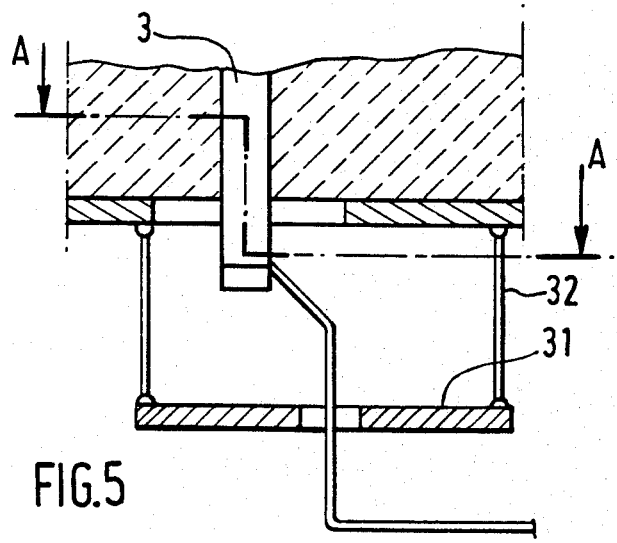

As shown in FIGS. 4 and 5, in a particularly simple embodiment, disks 31 are used, and these are perforated with a hole 33 allowing the passage of the vertical part 52 of the conductor and are offset relative to the axis of the electrode 3 towards the conductor 51, so as to mask the horizontal part of this conductor over a sufficient length to prevent the field lines from passing through the passage hole in the electrode, in view of the form and orientation of the said conductor.

This embodiment having simple plates supported by tie rods is simple, inexpensive and easily removable. However, to provide a mask between each conductor 5 and the corresponding electrode 3, a more complicated arrangement could be used, such as, for example, a shroud surrounding the lower part of the hearth electrode 3.

We claim:

1. An electric direct-current metal-melting furnace comprising
   (a) a vessel (1) delimited by a bottom (11), covered with a refractory heath (15), and a sidewall (12), and closed by a removable cover in the form of a vault (13), said vessel containing a batch of raw material;
   (b) means for melting said raw material to form a molten-metal bath (26), said means for melting comprising:
      (i) at least one consumable vault-electrode (2) mounted for vertical sliding movement through said vault (13) and placed above at least one fixed hearth-electrode (3), which is in contact with said raw material;
      (ii) a direct-current source (4) having a negative pole (41) connected to said at least one consumable vault-electrode (2) by means of at least one feed conductor (22), and a positive pole (42) connected to said at least one hearth-electrode (3) by means of at least one return conductor (51);
      (iii) said at least one hearth electrode (3) passing through said refractory hearth (15) and said bottom (11) by a passage hole (30) and having a connection with a corresponding return conductor (51);
      (iv) said at least one return conductor (51) comprising a horizontal part passing relatively near the bottom (11) of said vessel (1); and
      (v) a magnetic screen arranged along the bottom (11) of said vessel (1) and being made of a metal of high relative permeability and covering at least a part of the latter surrounding each connection of said at least one return conductor (51) with said at least one fixed hearth electrode (3) and extending above the horizontal part of said at least one return conductor (51) over a sufficient length to prevent the magnetic field resulting from the passage of current through said horizontal part of said conductor (51) from spreading inside said vessel (1).

2. An electric direct-current metal melting furnace according to claim 1, wherein said magnetic screen is constituted by at least a part of the bottom (11) of said vessel (1), said part having a thickness which is greater than the thickness merely necessary to ensure mechanical resistance and is determined as a function of current intensity and the orientation of the conductors, so that said part of the bottom (11) itself forms a magnetic screen of sufficient permeability to reduce the deflection effects on the arcs.

3. An electric direct-current metal-melting furnace comprising
   (a) a vessel (1) delimited by a bottom (11), covered with a refractory hearth (15), and a sidewall (12), and closed by a removable cover in the form of a vault (13), said vessel containing a batch of raw material;
   (b) means for melting said raw material to form a molten-metal bath (16), said means for melting comprising
      (i) at least one consumable vault-electrode (2) mounted for vertical sliding movement through the vault (13) and placed above one at least one fixed hearth-electrode (3), which is in contact with said raw material;
      (ii) a direct-current source (4) having a negative pole (41) connected to said at least one consumable vault-electrode (2) by means of at least one feed conductor (22), and a positive pole (42) connected to said at least one hearth-electrode (3) by means of at least one return conductor (51);
      (iii) said at least one hearth-electrode (3) passing through said refractory hearth (15) and said bottom (11) by a passage hole (30) and having a connection with a corresponding return conductor (51);
      (iv) said at least one return conductor (51) comprising a horizontal part passing relatively near the bottom (11) of said vessel (1); and
      (v) a magnetic screen arranged along the bottom (11) of said vessel and being constituted by at least a part of the bottom (11) of said vessel (1), said part having a thickness which is greater than the thickness merely necessary to ensure mechanical resistance and is determined as a function of the current intensity and the orientation of the conductors so that said part of the bottom (11) itself forms a magnetic screen of sufficient permeability to reduce the deflection effects on the arcs.

4. An electric direct-current metal-melting furnace comprising
   (a) a vessel (1) delimited by a bottom (11), covered with a refractory hearth (15), and a sidewall (12), and closed by a removable cover in the form of a vault (13), said vessel containing a batch of raw material;
   (b) means for melting raw material to form a molten-metal bath (16), said means for melting comprising
      (i) at least one consumable vault-electrode (2) mounted for vertical sliding movement through the vault (13) and placed above at least one fixed hearth-electrode (3), which is in contact with said raw material;
      (ii) a direct-current source (4) having a negative pole (41) connected to said at least one consumable vault-electrode (2) by means of at least one feed conductor (22), and a positive pole (42) connected to said at least one hearth-electrode (3) by means of at least one return conductor (51);

(iii) said at least one hearth electrode (3) passing through said refractory hearth (15) and said bottom (11) by a passage hole (30) and having a connection with a corresponding return conductor (51);

(iv) said at least one return conductor (51) comprising a horizontal part passing relatively near the bottom (11) of said vessel (1); and (v) a magnetic screen arranged along the bottom (11) of said vessel (1) and being constituted by a plate (18) (31) in a metal of relative high permeability laid on or under said bottom (11) and covering at least a part of the latter surrounding each connection of said at least one return conductor (51) with said at least one fixed hearth electrode (3) and extending above the horizontal part of said at least one return conductor (51) over a sufficient length to prevent the magnetic field resulting from the passage of current through said horizontal part of said conductor (51) from spreading inside said vessel (1).

5. An electric direct-current metal-melting furnace comprising
(a) a vessel (1) delimited by a bottom (11), covered with a refractory hearth (15), and a sidewall (12), and closed by a removable cover in the form of a vault (13), said vessel containing a batch of a raw material;
(b) means for melting said raw material to form a molten-metal bath (16), said means for melting comprising
  (i) at least one consumable vault-electrode (2) mounted for vertical sliding movement through the vault (13) and placed above at least one fixed hearth-electrode (3), which is in contact with said raw material;
  (ii) a direct-current source (4) having a negative pole (41) connected to said at least one consumable vault-electrode (2) by means of at least one feed conductor (22), and a positive pole (42) connected to said at least one hearth-electrode (3) by means of at least one return conductor (51);
  (iii) said at least one hearth electrode (3) passing through said refractory hearth (15) and said bottom (11) by a passage hole (30) and having a connection with a corresponding at least one return conductor (51);
  (iv) said at least one return conductor (5) comprising a vertical part (52) connected to the corresponding hearth electrode (3) and a horizontal part (51) passing relatively near the bottom (11) of the said vessel (1); and
  (v) a magnetic screen arranged along said bottom (11) of said vessel (1), at least a part of said magnetic screen being constituted by at least one individual magnetic screen (31) associated with each return conductor (51) and comprising a plate in a metal of high magnetic permeability suspended on said bottom (11) and located underneath the corresponding passage hole (30) of said corresponding electrode (3), said plate (31) having an orifice (33) for the passage of said vertical part (52) of said return conductor (51) and being offset relative to the axis of said electrode (3) towards said conductor (51) so as to mask the horizontal part of said conductor (51) over a sufficient length to prevent the field lines from passing through the passage hole (30).

6. A melting furnace as claimed in claim 1, wherein the bottom (11) of the vessel (1) is made of a magnetic metal, the thickness of which is determined in order to withstand the forces exerted, and said magnetic screen is constituted by a plate (18) made of a metal of high relative permeability and laid on or under said bottom (11) for covering said at least one part of the latter surrounding the connections of the hearth electrodes (3) over a sufficient surface to form a magnetic screen capable of at least reducing the deflection effects on the arcs.

7. A melting furnace as claimed in claim 2 or 6, wherein said at least one part of the bottom (11) forming the magnetic screen is made of laminated metal.

8. A melting furnace as claimed in any one of claims 1 to 3, wherein said at least one part of the bottom covered by said magnetic screen represents a proportion of between one-fifth and the whole of the surface of the bottom.

9. A melting furnace as claimed in any one of claims 1 to 3, wherein each return conductor (51) is associated with an individual magnetic screen (31) comprising a plate of high magnetic permeability which is located underneath the passage hole (30) of the corresponding electrode (3) and the dimensions and position of which are determined so as to mask a sufficient length of the horizontal part of each conductor (51) relative to said passage hole (30), thus preventing the corresponding field lines from passing through said passage hole (30).

10. A melting furnace as claimed in claim 9, wherein the individual magnetic screens (31) are each formed by a stack of metal sheets suspended on the bottom of the vessel.

* * * * *

UNITED STATES PATENT AND TRADEMARK OFFICE
CERTIFICATE OF CORRECTION

PATENT NO. : 4,856,021
DATED : August 8, 1989
INVENTOR(S) : Janiak, et al.,

It is certified that error appears in the above-identified patent and that said Letters Patent is hereby corrected as shown below:

On the title page: Item [73] should read as follows:

--CLECIM Courbevoie France--

Signed and Sealed this

Twelfth Day of February, 1991

*Attest:*

HARRY F. MANBECK, JR.

*Attesting Officer*      *Commissioner of Patents and Trademarks*